United States Patent [19]

Mouissie

[11] Patent Number: 4,845,596
[45] Date of Patent: Jul. 4, 1989

[54] SURFACE ILLUMINATION DEVICE USING OPTICAL CONDUCTORS

[75] Inventor: Bob Mouissie, Berlicum, Netherlands

[73] Assignee: E. I. Du Pont de Nemours and Company, Wilmington, Del.

[21] Appl. No.: 222,494

[22] Filed: Jul. 21, 1988

[30] Foreign Application Priority Data

Jul. 29, 1987 [NL] Netherlands ............... 8701794

[51] Int. Cl.[4] .................................. F21V 7/05
[52] U.S. Cl. ................................ 362/32; 362/30; 362/26; 350/96.10; 350/96.24
[58] Field of Search ............ 362/32, 23, 26, 30; 350/96.10, 96.24, 96.25, 96.29, 96.31

[56] References Cited

U.S. PATENT DOCUMENTS

| | | | |
|---|---|---|---|
| 3,718,814 | 2/1973 | Van Slyke | 240/8.16 |
| 3,781,537 | 12/1973 | Ramsey | 362/32 |
| 4,172,631 | 10/1979 | Yevick | 350/96.25 |
| 4,510,555 | 4/1985 | Mori | 361/32 |
| 4,598,975 | 7/1986 | Bussard et al. | 350/96.24 |
| 4,761,047 | 8/1988 | Mori | 362/32 |

FOREIGN PATENT DOCUMENTS 2464856 6/1979 France.

Primary Examiner—Ira S. Lazarus
Assistant Examiner—Sue Hagarman

[57] ABSTRACT

An illumination device for producing uniform illumination of a surface, comprising several parallel optical conductors which are placed above an optically reflecting surface, and whose reflecting outside sheath is removed locally at least in such a way that the light thereby emerging from the optical conductor is reflected by the reflecting surface to the surface to be illuminated. The optical conductors are spaced at such intervals and placed at such a distance above the reflecting surface that the light reflected by the reflecting surface can reach the surface to be illuminated on the other side of the optical conductors through the space between the optical conductors in such a way that the most uniform possible illumination of said surface is obtained.

16 Claims, 1 Drawing Sheet

SURFACE ILLUMINATION DEVICE USING OPTICAL CONDUCTORS

BACKGROUND OF THE INVENTION

The present invention relates to an illumination device for producing uniform illumination of a surface and, more particularly, to such an illumination device comprising several optical conductors which are placed above an optically reflecting surface and whose reflecting outer sheath is removed locally in such a way that the light thereby emerging from the optical conductor is reflected by the reflecting surface to the surface to be illuminated.

An illumination device of this type can be used for background illumination of flat information display units such as liquid crystal display panels, text panels, instrument panels, etc.

The most common illumination devices used for this hitherto consist of extensive reflectors (mirrors) with a light source at their focal point. A flat, elongated object is generally uniformly illuminated by using a linear light source and an oblong (parabolic) reflector. In order to obtain the most uniform surface illumination possible, a diffusion screen of, say, frosted glass generally also has to be fitted between the reflector and the surface to be illuminated. A strong light source often has to be used to make it possible to meet the minimum standards of illumination intensity required. In practice, optically transparent plastic prisms are also often used instead of reflectors.

The geometric dimensions of these devices are, however, such that they are relatively deep and heavy, which makes them unsuitable for use where space-saving is essential; for example, in aircraft, cars, measuring instruments, consumer electronics, etc. The relatively strong light source also means that they are not very suitable for energy-saving applications; for example, in space vehicles, portable equipment, etc.

Recent developments in the field of electro-luminescent illumination elements, where light is emitted by a crystalline structure under the influence of an electric field, also offer possibilities for obtaining uniform surface illumination. Large surfaces can be illuminated with these relatively thin elements. The low heat production means that they are suitable particularly for uses where infrared light is undesirable; for example, in night visibility equipment. However, since the light intensity of these elements depends on the amplitude and frequency of the main voltage, separate electronically controlled supply equipment is needed, which can be a disadvantage in, inter alia, energy-saving applications or equipment with little extra installation space.

The surface illumination devices made up of optical conductors such as mentioned above offer excellent possibilities for avoiding the disadvantage of light sources with high power, additional installation space or electronically controlled supply circuits.

Light can be beamed into the conductors at an end face thereof using a simple light source; for example, a light bulb. The light beamed in is propagated in the core of the optical conductor by means of total reflection at the outer sheath. Depending on the angle at which the light is beamed in, part of it will also be propagated in the outer sheath.

If the outer sheath is now removed locally, part of the light will come out of the optical conductors at those points. If this emerging light is then reflected at a flat reflecting surface, it is possible by using several, for example, parallel optical conductors, directed away from the reflecting surface to achieve more or less uniform illumination of the surface to be illuminated, for example, the rear side of a liquid crystal display panel, irrespective of the dimensions of the surface to be illuminated.

In the known devices of this type, relatively cheap optical conductors which are efficient per se, having a core and an outer sheath of plastic are used. The reflecting outer sheath of the optical conductors is locally broken through in an uncontrolled manner through thermal deformation or is partially melted away. The conductors are placed very close to each other; for example, bonded to each other, and fitted directly to the reflecting surface. The light is beamed in by a lightbulb.

The known devices have a number of characteristic disadvantages. Due to the fact that the optical conductors placed against each other above the reflecting surface, the reflected light will have to be propagated in a radial direction by the optical conductors to the surface to be illuminated, which is, of course, accompanied by additional losses. Fitting the guides directly on the reflecting surface means that the emerging and reflected light does not have sufficient chance of actually reaching the surface to be illuminated. Part of it will be absorbed again into the optical conductor itself by the outer sheath which is still largely intact. The locally uncontrolled deformation of the outer sheath also means that optimum reflection of all the light emerging from the optical conductors does not take place.

Since the optical conductors are entirely of plastic, compensation for the above-mentioned losses through increasing the light bulb power is limited as a result of the maximum permissible surface temperature of the lightbulb, which must be lower than the melting temperature of the optical conductors. In order then to increase the output, optical conductors of greater cross-section will have to be used. The reflected light propagated in the radical direction by the optical conductors to the surface to be illuminated will, however, be additionally weakened as a result of this greater cross-section.

SUMMARY OF THE INVENTION

The object of the present invention is to eliminate these above-mentioned disadvantages and produce a surface illuminating device by means of optical conductors of the type referred to in the preamble in which, according to the invention, the outer sheath of the optical conductor is removed in lengthwise direction over part of the periphery opposite the reflecting surface in that the center-to-center distance between adjacent optical conductors is equal to or greater than the external diameter of an optical conductor, the optical conductors being spaced at such intervals and placed at such a distance above the reflecting surface that the light reflected by the reflecting surface can reach the surface to be illuminated on the other side of the optical conductors through the space between the optical conductors in such a way that the most uniform possible illumination of said surface is obtained.

Due to the fact that the adjacent optical conductors are displaced relative to each other over a certain distance, there is sufficient space for the light reflected by the reflecting surface to reach the surface to be illuminated virtually unattenuated.

Since the optical conductors according to the invention are arranged at a distance above the reflecting surface, this effectively prevents reflected light from being absorbed again through the outer sheath into the optical conductors. In accordance with the present invention, it is possible for this purpose to provide at least a first layer of virtually optically transparent material between the optical conductors and the reflecting surface. Thus at least one layer can advantageously be an adhesive layer, by means of which the light guides are bonded to the reflecting surface.

In order also effectively to prevent reflected light from being absorbed again in the optical conductor, a preferred embodiment of the optical conductors used in the invention is characterized in that the thickness of the outer sheath gradually decreases in the peripheral direction towards the part of the optical conductor where the sheath has been removed.

When the optical conductors light guides are in direct contact with the surface to be illuminated, linear light intensity reductions can occur on the contact points with the optical conductors, depending on the structure and the optical features of the surface to be illuminated. Regardless of the features of the surface to be illuminated, this undesirable phenomenon can be prevented in an effective manner by placing the surface to be illuminated at a distance from the optical conductors. An embodiment of the present invention is for that purpose characterized in that at least one second layer of virtually optically transparent material is provided between the optical conductors and the surace to be illuminated. According to a preferred embodiment of the present invention, this second layer can be an adhesive layer by means of which the optical conductors are bonded to the surface to be illuminated.

In particular, in the case of elongated surfaces to be illuminated, the losses in the lengthwise direction of an optical conductor must remain limited in order to obtain surface illumination which is as uniform as possible. Owing to the fact that in the present invention use is made of optical conductors with a glass core and a hard outer sheath which have less light loss and better optical properties than optical conductors with a plastic core, great uniform light output can be achieved. Since optical conductors made of glass can withstand higher temperatures than plastic optical conductors, a light source (lightbulb) of greater power can also be used.

In devices where light is beamed in at only one end of the optical conductors, relatively great light loss occurs, due to the fact that the light can come out at the not illuminated end of the optical conductors without reflecting from the reflected surface. A suitable way of preventing this undesired light loss is to beam in light at both ends of an optical conductor. If one and the same light source is used for this and the optical conductors are conveyed back to the light source bypassing the reflecting surface, the result is that a major part of the length of the optical conductors does not contribute to the surface illumination. Since in large areas the total length of the optical conductors used can reach considerable values, this is not an advantageous solution from the economic point of view. In order to use the required optical conductor length as much as possible for the surface illumination, a preferred embodiment of the invention is to that end characterized in that the optical conductors are bent over after passing the reflecting surface and are conveyed back over the reflecting surface to the light source. They preferably take up the same position in relation to each other in the two halves of the device divided by the central axis in the lengthwise direction of the optical conductors and project to the outside with their ends on the same side of the reflecting surface at the point where the other ends go in.

Since the ends of the optical conductors need project only over a relatively short distance outside the reflecting surface so that they can be bunched together for beaming in light from a common light source, it will be clear that in this embodiment only a small percentage of the total optical conductor length does not actually effectively contribute to the forming of the surface illumination.

By this manner of arrangement, the distance between the "out-going" and "incoming" part of an optical conductor is for all optical conductors equal to half the measurement of the surface to be illuminated at right angles to the optical conductors. In the case of surfaces with relatively great widths in particular, the advantage hereof is that virtually no additional optical conductor length is needed to deflect the optical conductors along a sufficiently wide arc. This is important both for maintaining the optical properties of the optical conductors and for limiting the material stresses caused therein due to the bending.

If the illumination device is exposed to vibrations or shocks, according to another advantageous embodiment of the invention the optical conductor and the reflecting surface can be embedded in a casing of virtually optically transparent material. In this way, the above-mentioned distances between the optical conductor and the reflecting surface and between the optical conductors and the surface to be illuminated can then be achieved and maintained.

BRIEF DESCRIPTION OF THE DRAWINGS

The invention will now be explained in greater detail with reference to an embodiment shown in the drawing wherein.

DETAILED DESCRIPTION OF THE INVENTION

Figure 1:
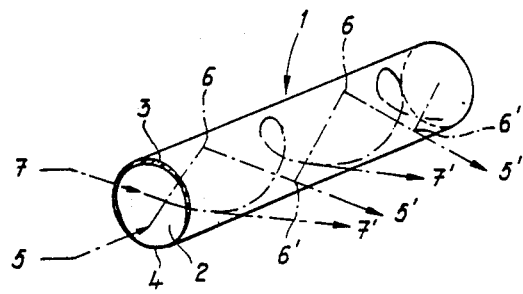
FIG. 1 shows schematically a preferred embodiment of an optical conductor used in the present invention with reflecting and emerging light rays shown therein by dotted lines.

In the optical conductor 1 shown in FIG. 1, the outer sheath 3 disposed around the light-conducting core 2 is removed in the lengthwise direction at the part of the periphery indicated by 4. The refractive index $n_1$ of the core 2 has a greater value than the refractive index $n_2$ of the outer sheath 3. In fiber optics technology, this is known as a so-called "step-index" profile.

Light rays beamed within a certain maximum acceptance angle from the center line of the optical conductor into the core, for example the light beam 5, will reflect fully on the interface of the core and the outer sheath, indicated by 6 and 6' in the drawing, and are propagated further in the core of the optical conductor. A measure of this maximum acceptance angle is given in fiber optics technology by the so-called numerical apperture (NA), which is determined by the refractive indices of the core and the outer sheath. The greater the NA, the more light can be beamed into the optical conductor and can be propagated in a reflecting manner in the core of the fiber. Light beams which are beamed in outside the NA, such as the beam 7, will not be propagated in reflecting fashion in the core, but in helical form in the outer sheath, if present, or will leak out thorugh the outer sheath.

If, however, the outer sheath is partially removed, a light beam 7 being propagated therein will emerge as shown by the light beam 7'. The light beam 5 being propagated in the core will also come out due to irregularities in the core structure, as shown by the light beams 5', although to a lesser extent that the light beam 7. In order to let as much light as possible come out, it must thus be ensured that the optical conductor has a low NA and that as many light modes (many reflections) as possible are propagated therein. In fiber optics technology, this type of optical conductor with many light modes is known by the name of multimode step-index glass fibers.

It goes without saying that several light beams can be beamed into the optical conductor 1 at different angles and they then emerge at different angles on the periphery where the outer sheath is removed. For the sake of clarity, however, only two representative beams are shown.

Figure 2:
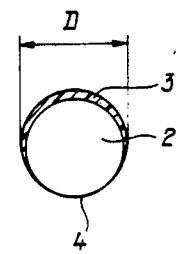
FIG. 2 shows a front view of the optical conductor of FIG. 1.

FIG. 2 shows a view of the end face of the optical conductor guide of FIG. 1. It can be seen clearly that the outer sheath 3 is machined in such a way that its thickness gradually decreases in the direction of the peripheral part 4 where the sheath has not been fully removed. This gradual decrease in the thickness is not, however, necessary. The average external diameter of the optical conductor is equal to D.

Figure 3:
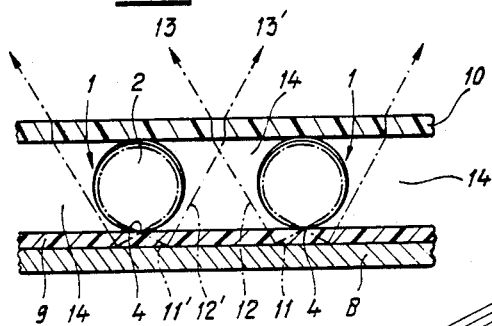
FIG. 3 shows a cross-section of an embodiment of an illumination device constructed in accordance with the present invention, with emerging and reflected light rays shown by dotted lines.
Figure 4:
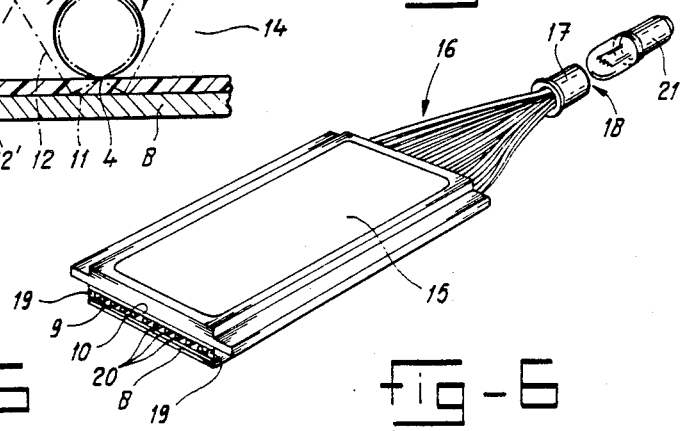
FIG. 4 shows in perspective an embodiment of a surface illumination device according to the present invention constructed in accordance with FIG. 3.
Figure 5:
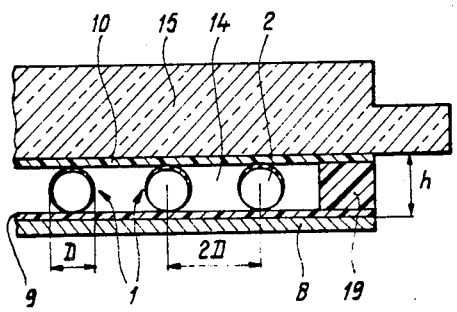
FIG. 5 shows a cross-section on an enlarged scale of the device of FIG. 4.

FIG. 3 shows a partial cross-section of a surface illumination device constructed in accordance with the present invention. The two optical conductors 1, 1' shown are displaced relative to each other over a particular distance above an optically reflecting surface 8. The portion 4 of the periphery of the light conductors or guides where the outer sheath is removed is opposite and faces the reflecting surface 8. Between the optical conductor 1 and the reflecting surface 8 there is a virtually optically transparent layer 9 with refractive index $n_3$ by means of which the optical conductors are held at a distance above the reflecting surface 8. The layer 9 may comprise several separate layers, at least one adhesive layer of which is bonded to the reflecting surface 8. The top side of the optical conductors also has a virtually optically transparent layer 10 with refractive index $n_4$, above which the surface to be illuminated, which is shown in FIGS. 4 and 5, can be located.

The light beams 11, 11' emerging from the optical conductors 1 will reach the reflecting surface 8 via the layer 9 and will thereby be reflected. These reflected light beams 12, 12' can now be propagated unimpeded between the optical conductors into the spaces 14 in the direction of the layer 10. This layer functions as a so-called plane-parallel plate, by means of which the light beams 12, 12' falling thereon undergo a parallel displacement, namely to 13, 13' so that sufficient light will also be diffused where the optical conductors are located, which gives a very uniform surface lighting.

In order to permit deflection in a special way of the light falling thereon, the layer 10 may also comprise several separate layers with different refractive indices. Instead of an optically transparent layer, depending on the desired light intensity, an optical diffusion layer can also be used to bring about an even greater diffusion of the reflected light. However, this is not necessary.

The thickness of the intermediate layer 9 must be selected in such a way that as much of the light 11, 11' as possible emerging from the optical conductor is not absorbed again in the opitcal conductor after reflection 12, 12'. This is the purpose of the special way in which the outer sheath is gradually removed according to the preferred embodiment of the optical conductor from FIG. 2. It will, however, be clear that embodiments in which the outer sheath is not removed in gradually decreasing fashion, but is simply removed over a part of the periphery in the longitudinal direction of the optical conductor can also be used for this purpose, although this is less effective. The layer 8 may also comprise several separate layers with differing refractive indices, in order to deflect the light beams emerging from the optical conductors in as effective a manner as possible to prevent reflection into the conductors themselves as much as possible.

The thickness and the optical features of both the intermediate layer 9 and the layer 10 must, however, be chosen in such a way that no visible color dispersion occurs.

FIG. 4 shows in perspective an embodiment of a surface illumination device constructed according to the invention. Several parallel optical conductors projecting with one end 16 beyond the device are disposed between the opitcally transparent layers 9 and 10. It will be clear that the outer sheath of the ends of the optical conductor projecting to the outside is preferably not machined but is intact. The optical conductors 16 conveyed to the outside are bunched together in a coupling element with, for example, a lens-shaped optical coupling face 18. Light is beamed in by the light source 21 at the bunched optical conductor ends 16 via the coupling face 18. The light source can be an ordinary light-bulb 21 with a broad beam of light. The coupling element 17 will preferably be designed in such a way that as much light as possible is coupled in outside the angle determined by the NA. The object 15 to be illuminated, for example, a liquid crystal display panel, is directly above the layer 10 here. The optical conductors can be open at the ends 20 or can be closed (in reflecting fashion).

In the partial cross-section of the embodiment according to FIG. 4 shown on an enlarged scale in FIG. 5, it can be seen that spacers 19 are disposed at the edges of the reflecting surface 8 in the lengthwise direction of the optical conductors in order to reinforce the structure.

In order to obtain the strongest possible illumination of the object 15, the heigth h, measured from the reflecting surface 8 to the bottom edge of the object 15 to be illuminated, must be kept as small as possible, on account of attenuation losses of the light. For this purpose, the layer 10 can advantageously be a virtually opitcally transparent adhesive layer by means of which the otpical conductors are bonded to the surface to be illuminated. This also provides the possibility of dispensing with the layer 9 if necessary, in which case the reflecting surface 8 is held at a distance from the optical conductors 1 by means of the spacers 19. A free space is then present between the optical conductors 1 and the reflecting surface 8.

If adhesive layers are used for fixing the optical conductors to the reflecting surface and/or fixing the optical conductors to the surface to be illuminated, the adhesive layers will have to have virtually constant optical features over a larger temperature range on account of the heat development with a possible infrared component in the light radiated out.

If the illumination device is subject to vibrations or shocks, the fibers 1 and the reflecting surface 8 can be completely embedded according to the present invention in a virtually optically transparent material. Depending on the object 15 to be illuminated, it is also possible to embed the illumination device and the object as one unit.

As can be seen from the figures, the optical conductors are placed at a center-to-center distance of at least about twice the average external diameter D of the optical conductors. With this preferred distance, there is sufficient space 14 between adjacent optical conductors 1 to ensure that the reflected light rays can reach the surface to be illuminated virtually unimpeded by the optical conductors 1. Greater distances between them are, however, also possible.

In the embodiment according to FIG. 4, light is coupled in at only one end of the optical conductors. Without special measures, all the light which has not come out earlier could leak away at the ends 20, without having contributed to the formation of the surface illumination. It would therefore be effective to couple in light at both ends of an optical conductor. This can take place, for example, with the aid of two separate light sources, where both one and the other end of the optical conductors are bunched together. Since through the use of optical conductors with a core of glass, the light source in the present invention can be of relatively great power, it is, however, efficient to convey (back) the optical conductor ends to one and the same light source.

Figure 6:
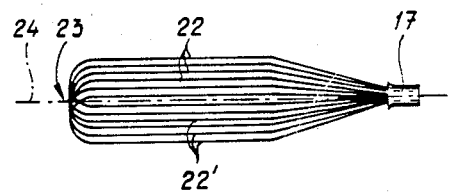
FIG. 6 shows schematically a preferred embodiment for arranging the optical conductors in accordance with the present invention.

Simply conveying back the extended ends 20, bypassing the reflecting surface to the common light 21 is a less efficient solution, particularly in the cases of elongated usraces to be illuminated. The length of the optical conductors not contributing effectively to the formation of the surface illumination can be very considerable in this case. The light in the ends 20 conveyed back towards the common light source is also additionally attenuated even before it hits the reflecting surface, as a result of the length of the optical conductor. If the optical conductors are arranged in the manner shown schematically in FIG. 6, with the "outgoing" parts 22 and the "incoming" parts 22' of the integral optical conductors assuming the same position in relation to each other in the half faces divided by the center line 24, it will be possible for the minimum length of light guide to suffice. Due to the fact that the parts 22,22' of the optical conductors are always displaced relative to each other at a distance equal to half the dimension of the reflecting surface at right angles to the optical conductors, all optical conductors are of the same length, which is an advantage when the illumination device is being produced.

This distance apart is also relatively great in relation to the diameter D of the optical conductors so that the parts 23 of the optical conductors can be bent with a sufficiently large radius, without additional optical conductor length. A sufficiently large bending radius is necessary to maintain the light-conducting properties of the optical conductors and to cause the smallest possible mechanical stresses therein.

The intensity of the surface illumination can be varied in a simple manner (not shown) by controlling the light source 21. The light source 21 can also, of course, consist of several light sources, if necessary emitting different colors of light (not shown).

The invention is not limited to the flat surface to be illuminated as shown in FIG. 4. Curved surfaces with matching curved designs of the reflecting surface 8 are also illuminated. Optical conductors with shapes other than purely round shapes can also be used.

It goes without saying that a number of modifications and additions are possible without going beyond the scope of the invention.

What is claimed:

1. An illumination device for uniformly illuminating a surface comprising:
    an optically reflective surface,
    an object containing the surface to be illuminated,
    a plurality of optical conductors disposed in parallel relation between said optically reflective surface and said surface to be illuminated,
    a light source disposed at at least one end of said plurality of optical conductors and providing light beams which propagate down each conductor,
    each of said optical conductors comprising a light conducting core and an outer sheath surrounding said core except lengthwise along a portion of the periphery of said core facing said optically reflective surface,
    said parallel optical conductors being spaced apart a first predetermined distance and being disposed above said optically reflective surface a second predetermined distance so that light emerging from the conductors along the lengthwise portion of the periphery of each said conductor core without said outer sheath can be reflected by the reflecting surface between said optical conductors toward the surface to be illuminated whereby uniform ilumination of said surface to be illuminated is obtained.

2. An illumination device according to claim 1, further comprising a first layer of virtually optically transparent material disposed between the optical conductors and said reflecting surface.

3. An illumination device according to claim 2, wherein said first layer is an adhesive layer by means of which the optical conductors are bonded to the reflecting surface.

4. An illumination device according to claim 2, further comprising a second layer of virtually optically transparent material disposed between the optical conductors and the surface to be illuminated.

5. An illumination device according to claim 4, wherein said second layer is an adhesive layer by means of which the optical conductors are bonded to the surface to be illuminated.

6. An illumination device according to claim 1, wherein the optical conductors are embedded in a casing of virtually optically transparent material.

7. An illumination device according to claim 1, wherein the thickness of the outer sheath decreases gradually in the peripheral direction towards the portion of the optical conductor where there is no sheath.

8. An illumination device according to claim 1 wherein the plurality of parallel optical conductors disposed between said optically reflective surface and said surface to be illuminated are arranged in two groups, one group comprising outgoing optical conductors extending from said light source between said surfaces, and a second group comprising incoming optical conductors which represent the portions of said outgoing optical conductors which have passed between and beyond said surfaces and bent backward so as to extend back between said surfaces in parallel disposition toward said light source where the ends of the conductors of said incoming group may also receive light from said light source.

9. An illumination device according to claim 8, wherein the plurality of optical conductors disposed between said reflective surface and the surface to be illuminated may be divided along a centerline in the lengthwise direction of the optical conductors and wherein the outgoing group of conductors are disposed on one side of the centerline and the incoming group of conductors are disposed on the other side of the centerline, each respective outgoing and incoming conductor assuming the same relative position on their respective side of the centerline.

10. An illumination device according to claim 1 wherein the first predetermined distance said optical fibers are spaced apart, as measured between the center-to-center of adjacent optical conductors, is equal to or greater than the external diameter of an optical conductor.

11. An illumination device according to claim 1 wherein said object containing said surface to be illuminated is a liquid crystal display panel.

12. An illumination device according to claim 1, wherein the core of each conductor is formed of glass and has an index of refraction relative to that of the outer sheath to provide an otpical conductor with a relatively low numerical aperture so that as much light as possible outside the angle determined by the numerical aperture may be received within the conductor.

13. An illumination device according to claim 12 wherein the optical conductor is formed of multimode step-index glass to permit as many light modes as possible to be propogated therein.

14. An illumination device according to claim 4 wherein said second layer parallely displaces light beams incident therein, thereby providing diffused light in the area above where the optical conductors are located so that very uniform surface lighting reaches the surface to be illuminated.

15. An illumination device according to claim 1 wherein the outer sheath is removed lengthwise along each optical conductor along the peripheral portion of said conductor facing said optically reflective surface.

16. An illumination device according to claim 7, wherein the outer sheath is removed gradually along the periphery of each optical fiber towards the portion directly facing said optically reflective surface where said sheath is completely removed.

* * * * *